United States Patent Office 2,814,570
Patented Nov. 26, 1957

2,814,570

CELLULOSE ETHER COMPOSITIONS

Arthur W. Sloan, Washington, D. C., assignor to Atlantic Research Corporation, Alexandria, Va., a corporation of Virginia No Drawing. Application January 3, 1955,
Serial No. 479,641

25 Claims. (Cl. 106—181)

This invention relates to new and improved compositions comprising cellulose ethers and plasticizers and processes for making same.

For most purposes, it is necessary to combine water-insoluble cellulose ethers such as ethyl cellulose with plasticizer in order to increase suppleness of the plastic, lower its softening point and improve thermoplasticity. The usual practice hitherto has been to mix the cellulose ether with the plasticizer at elevated temperatures in a kneader or masticating mill to form a stiff paste or dough and then to extrude it under heat and pressure into the desired shape or to introduce the paste into a mold and subject the material to high temperatures and pressures. To prepare more fluid mixes, as, for example, for making coatings or films, it has been necessary to introduce considerable amounts of a volatile solvent or to form aqueous emulsions of the material. Since the volatile solvent and water must be removed, such a procedure is feasible for use only in the manufacture of thin films. Removal of the solvent also causes shrinkage of the film, which in many cases is undesirable.

The object of the invention is to provide homogeneous, fluid, pourable suspensions of water-insoluble cellulose ethers in plasticizer which can be formed into films or coatings of any desired thickness and of objects of substantially any desired shape or size without requiring the removal of volatile solvents or other dispersion media or the application of high temperatures and pressures for molding.

Other objects and advantages of my invention will become obvious from the following detailed description.

I have discovered that ethyl cellulose and other water-insoluble cellulose ethers can be dispersed or suspended in a plasticizer to form a fluid suspension which is pourable, homogeneous and stable when the cellulose ether particles possess certain essential characteristics. The particles must be small, substantially spherical and substantially non-porous. Particles having the desired characteristics and process for making them are described in copending Arthur W. Sloan application, Serial No. 479,640, filed January 3, 1955. Any suitable water-insoluble cellulose ether such as an alkyl ether or hydroxyalkyl ether as, for example, ethyl cellulose, butyl cellulose, hydroxyethyl cellulose and the like, may be employed.

As disclosed in said co-pending application, cellulose ethers having the requisite combination of characteristics can be prepared by dissolving the cellulose ether in a single solvent which is insoluble to moderately soluble in water or a mixture of solvents, at least one component of which is insoluble to moderately soluble in water and another component of which may be infinitely soluble in water, maximum solubility of the solvent in water being about 60% at 20° C. The resulting lacquer is dispersed in water in the presence of a colloiding agent and water-soluble salt or water-soluble polyhydroxy compound to form an oil-in-water type emulsion. Solvent is removed from the dispersed lacquer particles either by heating the emulsion up to or near the boiling point of the lacquer solvent or by diluting the emulsion with sufficient water to dissolve the solvent out of the particles. In the latter elution method, the least soluble solvent component must be moderately water-soluble. The following is a specific example of the process.

Twenty grams of ethyl cellulose (44.5–45.5% ethoxyl) were dissolved in 155 ml. of methyl acetate-methanol azeotrope. The lacquer was dispersed by vigorous agitation in 150 ml. of water containing 4.0 grams of sodium chloride, 2.1 grams of 4000 cps. methyl cellulose as the colloiding agent, and 1.6 grams of Turkey red oil as the emulsifying agent. Agitation was continued and the solvent was removed from the dispersed lacquer particles by distillation at atmospheric pressure. The final product consisted of 1–15 micron spheres. The density was 1.14.

As aforementioned, the particles must be substantially spherical. In other words, they should be true spheres or closely approximate spheres, such as spheroids. This characteristic contributes both to fluidity of the mix and makes possible the incorporation of adequate amounts of the cellulose ether into the plasticizer without loss of fluidity. The sphericity of the particles permits them to move freely relative to each other and thus eliminates the matting and interlocking which, in the case of irregularly shaped particles, reduces fluidity and causes sedimentation. Sphericity, furthermore, makes possible the introduction of a maximum volume of the cellulose ether with minimum surface area. The reduced surface area minimizes premature solvation of the cellulose ether by the plasticizer and thus is an additional factor in promoting fluidity.

Preferably the maximum average particle size is about 50 microns. In other words, the size distribution of the particles is desirably such that the maximum average by number is about 50 microns. Larger average sizes tend to form suspensions having a shorter shelf life than may be desirable for some purposes and also reduce somewhat the amount of cellulose ether which can be introduced into the plasticizer without loss of fluidity. Larger particles, as, for example, those ranging in size from about 50 to 100 microns, can be dispersed in plasticizer to form fluid suspensions which are stable, though of shorter shelf life than those formed by smaller particles, but cannot be introduced in quantities as large as those possible with the smaller particles unless some small particles are present which can slip into and fill the interstices between the larger particles. In general, the maximum particle size which can be tolerated is about 100 microns. Above this size the particles tend to sediment and present curing problems since the plasticizer may not adequately penetrate to the core of the large particle. Particle sizes ranging up to about 10 to 30 microns in diameter are generally optimum for most purposes. Products comprising spheres which are 1 to 2 microns in diameter or less form somewhat more viscous dispersions than products containing larger particles since the former tend to solvate rather rapidly because of the relatively large surface area presented by the very finely comminuted particles. Although such dispersions are sufficiently fluid to pour, it is desirable to have some larger particles interspersed among the very fine particles.

It is also essential that the small, spherical particles be substantially non-porous. Porous particles rapidly absorb the plasticizers to form wet powders.

The plasticizer may be any suitable non-volatile, high boiling liquid which dissolves the cellulose ether at elevated temperatures. Such plasticizers include, for example, phosphate esters such as tri-(2-ethyl-hexyl) phosphate, tributyl phosphate and tricresyl phosphate, phthalates such as diethyl phthalate, dibutyl phthalate, dioctyl phthalate, di-(methoxy-ethyl) phthalate, methyl phthalyl ethyl glycolate, ethyl phthalyl ethyl glycolate and butyl phthalyl butyl glycolate, citrates such as acetyl triethyl citrate and acetyl tributyl citrate, sebacates such as dibutyl sebacate, adipates such as diisobutyl adipate, benzyl benzoate, polyethylene glycol di-2-ethyl hexoate, butoxyethyl stearate, castor oil, the various chlorinated diphenyls, hydrogenated terphenyl and the like. The particular plasticizer used is largely determined by the particular properties desired in the finished product.

In general, the plasticizer should be of the type which solvates the cellulose ether slowly at ordinary temperatures and with relative rapidity at elevated temperatures. To some extent shelf life of the cellulose ether-plasticizer suspensions is determined by the solvation rate of the plasticizer at normal temperatures. The more readily the cellulose ether is solvated at room temperature, the shorter is the shelf life. Where the suspension is to be employed within a relatively short time after preparation, this is of little moment. Where an extended shelf life, as, for example, several days to weeks, is desired, it is preferable to choose a plasticizer having a negligible solvation rate at normal temperatures.

Combinations of solvent-type plasticizers can be employed to produce a plastic having the combined properties imparted by the individual plasticizers. Non-solvent-type plasticizers can also be used for their specific properties. However, non-solvent-type plasticizers should be used with a solvent-type plasticizer.

The ratio of cellulose ether to plasticizer is determined largely by the use to which the plastic product is to be put and by the particular plasticizer employed. In general, the higher the ratio of cellulose ether, the tougher and harder is the product. The preferred minimum ratio of cellulose ether, such as ethyl cellulose to plasticizer, is about 1:1 although smaller proportions of cellulose ether such as 2:3 may be employed. In general, the quantitative limit for the cellulose ether is set by the amount which the plasticizer can hold without loss of fluidity. This will vary with such factors as the particular plasticizer and average particle size and particle size distribution of the cellulose ether particles. The specific proportions of any given plasticizer needed to produce the desired physical properties can readily be determined by the skilled practitioner.

The cellulose ether-plasticizer suspensions are easily prepared by mixing the components with sufficient agitation to produce a homogeneous mix. For the most part mixing is done at normal or room temperature and preferably at a temperature not exceeding about 35° C., although in the case of certain plasticizers the temperature may be as high as 50° C., to avoid excessive solvation of the cellulose ether and undue increase in viscosity. In some cases it may be desirable to cool the mix. The resulting mix is a homogeneous, fluid suspension of the small, spherical particles, which is stable, generally, for a period of several hours to several weeks depending upon the particular plasticizer used and the size of the particles. We have found, also that the presence of a small amount of a protective coating agent, such as the colloid employed in making the particles according to the Sloan process previously referred to, reduces the solvation rate of the plasticizer at normal temperatures and produces somewhat more fluid suspensions.

The suspensions are, normally, sufficiently fluid to pour rapidly. In some cases, the viscosity of the mix may be such that pouring rate is somewhat slow and for manufacturing expediency it may be desirable to accelerate pouring by the application of slight pressures. However, even the more viscous suspensions are sufficiently fluid to fill and conform to the shape of the mold without application of heat or pressure. To produce molded objects of any desired shape or size the suspensions are poured into a suitable mold. They can be applied as coatings or films in any desired manner as by brushing, spraying or dipping. They can also be spread to form sheets of any desired thickness.

The cellulose ether plasticizer suspensions, after being introduced into molds or applied in the form of sheets or coatings, are cured by heating so that the cellulose ether substantially completely dissolves in the plasticizer solvent. The particular temperature employed is determined very largely by the particle size of the cellulose ether, the particular plasticizer and the desired rapidity of cure. The higher the temperature, the more rapid is the cure. It is, of course, desirable to avoid temperatures which are so high as to cause decomposition of the components.

The small size of the cellulose ether particles enhances rapidity of cure and, furthermore, ensures a homogeneous product in as much as the plasticizer can readily penetrate to the core of the small particles. In most cases, cure is obtained in a matter of minutes, as, for example, about 15 to 10 minutes, at temperatures of about 150 to 160° C. Curing can be accomplished at lower temperatures but generally require longer curing periods. For the most part, it is desirable to avoid temperatures above about 170 to 180° C. since some decomposition of the cellulose ether may occur.

Fillers and pigments of various kinds in finely divided form such as talc, carbon black, mica, sericite, zinc oxide, zinc sulfide, titanium dioxide, etc., can be introduced in substantial amounts into the cellulose ether-plasticizer suspensions without destroying fluidity. It is desirable that such fillers or pigments be in finely divided form.

Because of the homogeneous character of the cellulose ether-plasticizer dispersions from which they are made, the cured products are also homogeneous and readily reproducible.

The cured products are tough and non-brittle and are suitable for the manufacture of sheets, coatings, tubing and molded objects for any purpose for which plasticized cellulose ethers, such as ethyl cellulose, have hitherto been employed in the art.

The fluid cellulose ether-plasticizer suspensions are highly advantageous in as much as they make unnecessary the addition of volatile solvents or other fluid media, such as water, which have hitherto been required to make the plasticized cellulose ethers sufficiently fluid for such applications as coatings or films and which require the subsequent removal of the fluidifying media. Aside from the time and the cost of expensive solvents saved by my compositions, they eliminate the shrinkage which occurs when volatile solvents or water are removed. The cellulose ether-plasticizer suspensions make possible the formation of coatings and sheets of any desired thickness since they pose no problem of solvent removal which has hitherto hampered the art. The fluid suspensions also make possible the molding of objects of any desired shape or size without requiring preliminary kneading and masticating of the cellulose ether and plasticizer to form a stiff, dough-like paste or the application of high temperatures and pressures to press or mold the plasticized pastes or powders into a homogeneous mass of the desired shape. The use of volatile solvents or other liquid media to fluidify the plasticized mass where objects of any appreciable thickness are to be made is not feasible because of the difficulties encountered in removing such media from the interior portions of the pressed or molded objects.

Table I summarizes some examples illustrating preparation of fluid, homogeneous ethyl cellulose-plasticizer suspensions. The particles in all cases were substantially spherical and substantially non-porous, having a density of at least 1.1. The suspensions were formed by mixing the ethyl cellulose particles and plasticizer at room temperature. Suspensions formed were all homogeneous, stable, fluid and readily pourable. They were applied as films or poured into tubes and cured at 150° C. for 15 minutes to form homogeneous, solid gels.

Table I

| Particle size, microns | Plasticizer | Ratio ethyl cellulose to plasticizer | Remarks |
| --- | --- | --- | --- |
| 1-5 | Diethyl phthalate | 1:1 | Clear, tough plastic. |
| 1-10 | ___do___ | 1:1 | Opaque, tough plastic. |
| 1-25 | Trioctyl phosphate | 1:1 | Clear, tough plastic. |
| 1-10 | Polyethylene glycol di-2-ethylhexoate. | 1:1 | Soft, flexible plastic. |
| 1-25 | Butoxyglycol stearate | 1:1 | Clear, tough plastic. |
| 1-5 | Hydrogenated terphenyl. | 1:1 | Tough plastic. |
| 1-10 | ___do___ | 1:1 | Rigid, tough plastic. |
| 1-25 | ___do___ | 1:1 | Clear, tough plastic. |
| 1-5 | Castor oil | 1:1 | Soft, flexible plastic. |
| 1-10 | ___do___ | 1:1 | Do. |

Although this invention has been described with reference to illustrative embodiments thereof, it will be apparent to those skilled in the art that it may be embodied in other forms but within the scope of the appended claims.

I claim:

1. A fluid, pourable, substantially homogeneous suspension of water-insoluble cellulose ether in a liquid vehicle consisting essentially of non-volatile plasticizer characterized by its ability to dissolve the cellulose ether readily only at elevated temperatures, the cellulose ether being in the form of solid, substantially spherical, substantially non-porous particles having a maximum diameter of about 100 microns, the minimum ratio by weight of cellulose ether to plasticizer being about 2:3.

2. The composition of claim 1 in which the cellulose ether is lower alkyl cellulose.

3. A fluid, pourable, substantially homogeneous suspension of water-insoluble lower alkyl cellulose in a liquid vehicle consisting essentially of non-volatile plasticizer characterized by its ability to dissolve the alkyl cellulose readily only at elevated temperatures, the alkyl cellulose being in the form of solid, substantially spherical, substantially non-porous particles having a maximum average diameter of about 50 microns and a maximum diameter of about 100 microns, the minimum ratio by weight of alkyl cellulose to plasticizer being about 2:3.

4. A fluid, pourable, substantially homogeneous suspension of water-insoluble lower alkyl cellulose in a liquid vehicle consisting essentially of non-volatile plasticizer characterized by its ability to dissolve the alkyl cellulose readily only at elevated temperatures, the alkyl cellulose being in the form of solid, substantially spherical, substantially non-porous particles having a maximum diameter of about 30 microns, the minimum ratio by weight of alkyl cellulose to plasticizer being about 2:3.

5. The composition of claim 2 in which the lower alkyl cellulose is ethyl cellulose having a minimum density of about 1.1.

6. The composition of claim 3 in which the lower alkyl cellulose is ethyl cellulose having a minimum density of about 1.1.

7. The composition of claim 4 in which the lower alkyl cellulose is ethyl cellulose having a minimum density of about 1.1.

8. The composition of claim 5 in which the plasticizer is diethyl phthalate.

9. A process for making plasticized water-insoluble cellulose ether compositions which comprises mixing the cellulose ether in the form of solid, substantially spherical, substantially non-porous particles having a maximum diameter of about 100 microns with a liquid vehicle consisting essentially of non-volatile plasticizer, characterized by its ability to dissolve the cellulose ether readily only at elevated temperatures, to form a fluid, pourable, substantially homogeneous suspension of the cellulose ether in said plasticizer, the minimum ratio by weight of cellulose ether to plasticizer being about 2:3, and then heating the mixture to dissolve the cellulose ether in the plasticizer.

10. The process of claim 9 in which the cellulose ether is lower alkyl cellulose.

11. A process for making plasticized water-insoluble lower alkyl cellulose compositions which comprises mixing the alkyl cellulose in the form of solid, substantially spherical, substantially non-porous particles having a maximum average diameter of about 50 microns and a maximum diameter of about 100 microns with a liquid vehicle consisting essentially of non-volatile plasticizer characterized by its ability to dissolve the alkyl cellulose readily only at elevated temperatures, to form a fluid, pourable, substantially homogeneous suspension of the alkyl cellulose in said plasticizer, the minimum ratio by weight of alkyl cellulose to plasticizer being about 2:3, and then heating the mixture to dissolve the cellulose ether in the plasticizer.

12. A process for making plasticized, water-insoluble lower alkyl cellulose compositions which comprises mixing the alkyl cellulose in the form of solid, substantially spherical, substantially non-porous particles having a maximum diameter of about 30 microns with a liquid vehicle consisting essentially of non-volatile plasticizer characterized by its ability to dissolve the alkyl cellulose readily only at elevated temperatures, to form a fluid pourable, substantially homogeneous suspension of the alkyl cellulose in said plasticizer, the minimum ratio by weight of alkyl cellulose to plasticizer being about 2:3, and then heating the mixture to dissolve the cellulose ether in the plasticizer.

13. The process of claim 10 in which the lower alkyl cellulose is ethyl cellulose having a minimum density of about 1.1.

14. The process of claim 11 in which the lower alkyl cellulose is ethyl cellulose having a minimum density of about 1.1.

15. The process of claim 12 in which the lower alkyl cellulose is ethyl cellulose having a minimum density of about 1.1.

16. The proces of claim 13 in which the plasticizer is diethyl phthalate.

17. The composition of claim 2 in which the minimum ratio by weight of alkyl cellulose to plasticizer is about 1:1.

18. The process of claim 10 in which the minimum ratio by weight of alkyl cellulose to plasticizer is about 1:1.

19. A process for making plasticized lower alkyl cellulose compositions which comprises mixing the alkyl cellulose in the form of solid, substantially spherical, substantially non-porous particles having a maximum diameter of about 100 microns with a liquid vehicle consisting essentially of non-volatile plasticizer characterized by its ability to dissolve the alkyl cellulose readily only at elevated temperatures, to form a fluid, pourable, substantially homogeneous suspension of the alkyl cellulose in said plasticizer, the minimum ratio by weight of alkyl cellulose to plasticizer being about 2:3, spreading the fluid suspension into a sheet or film and then heating the suspension to dissolve the alkyl cellulose in the plasticizer.

20. The process of claim 19 in which the lower alkyl cellulose is ethyl cellulose having a minimum density of about 1.1.

21. The process of claim 20 in which the maximum average diameter of the ethyl cellulose particles is about 50 microns and the maximum diameter is about 100 microns.

22. A process for making plasticized lower alkyl cellulose compositions which comprises mixing the alkyl cellulose in the form of solid, substantially spherical, substantially non-porous particles having a maximum diameter of about 100 microns with a liquid vehicle consisting essentially of non-volatile plasticizer characterized by its ability to dissolve the alkyl cellulose readily only at elevated temperatures, to form a fluid, pourable, substantially homogeneous suspension of the alkyl cellulose in said plasticizer, the minimum ratio by weight of alkyl cellulose to plasticizer being about 2:3, pouring the fluid suspension into a mold, said suspension being sufficiently fluid to fill and conform to the shape of the mold, and then heating the suspension in the mold to dissolve the alkyl cellulose in the plasticizer.

23. The process of claim 22 in which the alkyl cellulose is ethyl cellulose having a minimum density of about 1.1.

24. The process of claim 23 in which the maximum average diameter of the ethyl cellulose is about 50 microns and the maximum diameter is about 100 microns.

25. The process of claim 23 in which the maximum diameter of the particle is about 30 microns.

References Cited in the file of this patent

UNITED STATES PATENTS

| | | |
|---|---|---|
| 1,516,225 | Webb | Nov. 18, 1924 |
| 1,908,550 | Staud et al. | May 9, 1933 |
| 1,910,948 | Dreyfus | May 23, 1933 |
| 1,921,582 | Pratt | Aug. 8, 1933 |
| 1,953,953 | Dreyfus | Apr. 10, 1934 |
| 2,477,009 | Sandler | July 26, 1949 |
| 2,591,904 | Zola | Apr. 8, 1952 |
| 2,604,412 | Dreyfus | July 22, 1952 |
| 2,722,528 | Johnson | Nov. 1, 1955 |

OTHER REFERENCES

Partridge et al.: Plastisols and Organisols, Rubber Age, vol. 67, August 1950, pages 553–560.